March 14, 1950      R. G. HESS      2,500,457
FLUID PRESSURE SWITCH

Filed Dec. 10, 1946      2 Sheets-Sheet 1

INVENTOR.
Robert G. Hess
BY
A. Schapp
ATTORNEY

March 14, 1950  R. G. HESS  2,500,457
FLUID PRESSURE SWITCH
Filed Dec. 10, 1946  2 Sheets-Sheet 2

INVENTOR.
Robert G. Hess
BY
A. Schapp
ATTORNEY

Patented Mar. 14, 1950

2,500,457

UNITED STATES PATENT OFFICE 2,500,457

FLUID PRESSURE SWITCH

Robert G. Hess, Los Angeles, Calif., assignor to Harry A. Dutton, Jr., Millbrae, Calif.

Application December 10, 1946, Serial No. 715,306

8 Claims. (Cl. 200—83)

The present invention relates to improvements in a fluid pressure switch and its principal object is to provide a switch that is operated by the pressure differential between two fluid pressure media.

More particularly my invention is intended for use in connection with airplanes for controlling certain electrically operated devices.

The principal use proposed for my invention at the present time is the operation of the retractable landing gear of an airplane, the switch being adapted to automatically set in motion landing gear raising machinery after the airplane has reached a certain speed known as airborne speed and to reverse the operation for automatically lowering the landing gear before the airplane lands on the ground surface.

For this purpose it is proposed to provide a switch which is operated by changes in the speed of the airplane and more particularly by pressure differentials in the static and dynamic lines of a Pitot tube commonly used in connection with an airplane speed indicator.

More generally it is an object of the present invention to provide apparatus for converting fluid pressure differentials into motion which is utilized to actuate electrically driven control equipment.

It is further proposed to provide a fluid pressure switch of the character described that will respond to minute variations in the pressure differential at the critical point so as to insure proper automatic action at the proper time after take-off and before landing.

While I have developed my invention particularly with a view of automatic control for the landing gear of an airplane, it is obvious that the invention may be applied to different purposes wherever it is desired to control apparatus by changes in the pressure differential between two pressure media.

Further objects and advantages of my invention will appear as the specification proceeds.

Figure 1:
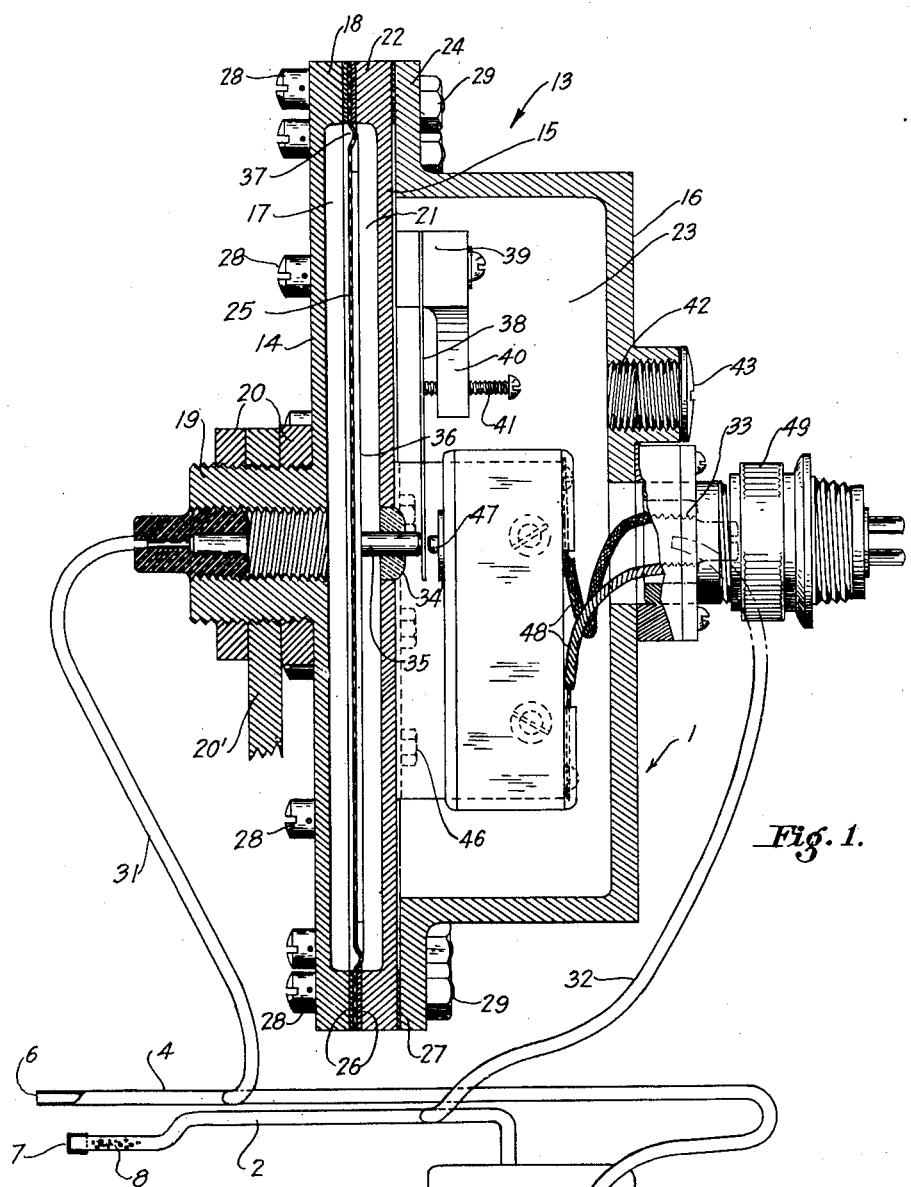
Figure 2:
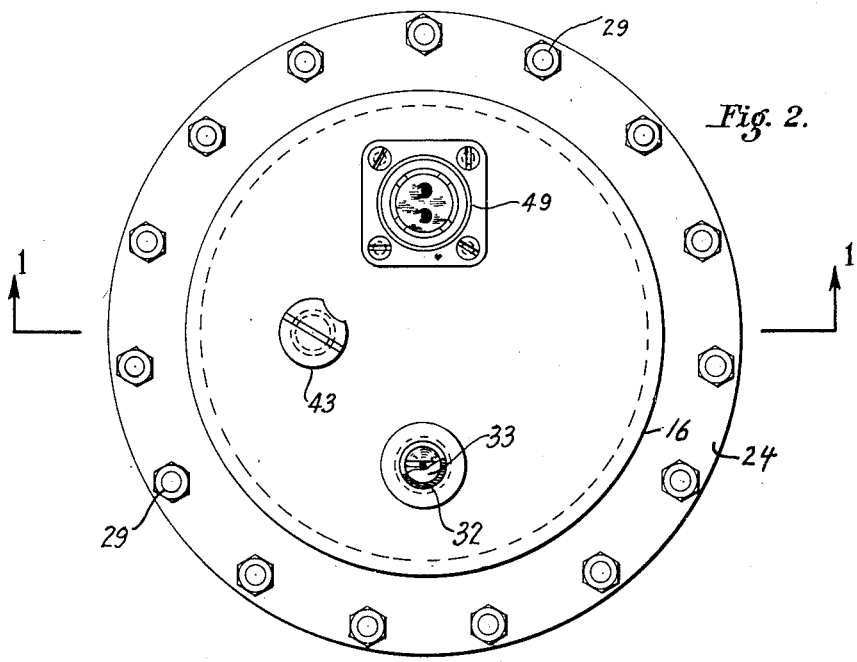
Figure 3:
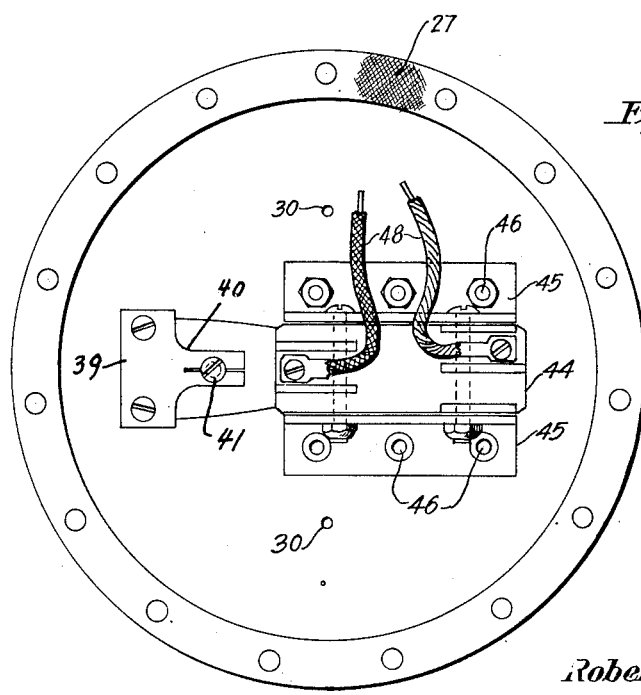

The preferred form of my invention is illustrated in the accompanying drawing in which Fig. 1 shows an axial section through my fluid pressure switch as connected with an airplane speed indicator hook-up, the section being taken along line 1—1 of Fig. 2, Fig. 2 a rear view of the fluid pressure switch, and Fig. 3 a rear view of a bearing plate assembly used in my device.

While I have shown only the preferred form of my invention I wish to have it understood that various changes or modifications may be made within the scope of the claims attached hereto without departing from the spirit of the invention.

Referring to the drawing in detail, my fluid pressure switch 1 is intended for connection into an airplane speed indicator system illustrated diagrammatically in connection with Figure 1 as comprising a Pitot tube mounted on the plane so as to point in the direction of flight and including a static line 2 leading to the indicator housing 3 and a dynamic line 4 leading to a curved tube 5 mounted inside the housing. The dynamic line is open to the air as at 6 so as to be subject to the air draft, while the static line is closed, as at 7, but formed with lateral perforations 8 to allow communication with the surrounding air and to cause the air inside the line and inside the housing to assume the same pressure as the outside air.

The tube 5 is closed at its end, and as the pressure inside the tube increases the tube tends to straighten out to operate a needle 9 pivoted at 10, against the opposition of a spring 11. The free end of the needle moves over a scale 12 calibrated to indicate the speed of the airplane with respect to the surrounding medium.

The apparatus thus far described is conventional and no novelty is claimed for the same.

My fluid pressure switch comprises a preferably annular housing 13 consisting principally of three elements, a front plate 14, a bearing plate 15 and a rear plate 16.

The front plate is recessed to form an annular chamber 17 and a surrounding flange 18. It is formed with a central, outwardly extending hub 19 threaded on the outside and on the inside. The outside of the hub carries two nuts 20 by means of which the hub may be clamped upon any suitable support, such as the number 20' forming part of an airplane.

The bearing plate 15 is shaped similarly to the front plate, and is recessed to form an annular chamber 21 and a surrounding flange 22.

The rear plate 16 is recessed deeply to form a large chamber 23 and is provided with an annular flange 24 of the same circumference as the other two plates.

A diaphragm 25 is clamped between the flanges 18 and 22 of the front and the bearing plates to separate the confronting chambers 17 and 21, suitable gaskets 26 being interposed between the diaphragm and the flanges. A further gasket 27 is interposed between the flanges 22 and 24, and the three plates are held in assembled relation by an annular series of bolts 28 and nuts 29.

Chambers 21 and 23 are interconnected through small openings or orifices 30 in the bearing plate.

Chamber 17 is connected to the dynamic line 4 of the Pitot tube through a conduit 31 attached to the hub 19, and chamber 23 is connected to the static line 2 of the Pitot tube through a conduit 32 as at 33, the static pressure being communicated to chamber 21 through the orifices 30 in the bearing plate 15. Thus the diaphragm 25 is subjected, on opposing sides, to the dynamic and static pressures of the Pitot tube.

The bearing plate has a central bearing 34 in which a piston 35 is mounted with freedom of sliding motion. This piston carries at its front end a disc 36 made of rigid material to bear against the diaphragm, the disc being almost of the same size as the diaphragm except for a wavy rim section 37 of the latter which is disposed outside the disc.

The rear end of the piston extends beyond the bearing plate and bears upon the free end of a leaf spring 38 mounted in spaced and parallel relation to the bearing plate in a block 39 having a depending lip 40 adapted to receive a calibrating screw 41 by means of which the tension of the leaf spring toward the piston may be adjusted. The rear plate 16 has an opening 42 opposite the screw 41 through which a screw driver may be inserted for adjusting the screw. The hole is normally closed by a plug 43.

A switch 44 of standard construction and known in the market as the micro-switch manufactured by Micro-Switch Corporation is mounted on the bearing plate opposite the plunger between two angle irons 45 secured upon the bearing plate by means of bolts 46, the switch having an actuating pin 47 mounted in alinement with the piston and in slightly spaced relation to the interposed leaf spring. The switch is self-opening and is closed by pressure brought to bear on the pin 47. Any suitable switch may be substituted as long as it has an actuating element operable by the advance of the piston. The switch has conduit connections 48 leading to a standard plug 49 adapted for connection into the circuit to be controlled.

In operation, the diaphragm is subject to the dynamic pressure of the Pitot tube at the front and subject to the static pressure of the Pitot tube in the rear, the latter pressure being applied through the disc 36. In normal operation the spring 38 crowds the piston 35 away from the pin 47.

The dynamic pressure increases as the airplane gathers speed, and after the plane has been lifted off the ground the pressure differential between the dynamic and static pressures becomes sufficiently great to cause the diaphragm to advance the piston 35 over the opposition of the leaf spring and to urge the pin 47 into switch closing position for raising the landing gear.

As the airplane slows down for landing, the dynamic pressure decreases, and before the plane lands, the pressure differential drops sufficiently to cause the spring 38 to overcome the pressure differential and to crowd the piston 35 back, which allows the switch to open for lowering the landing gear.

The tension of the spring 40 may be adjusted to a fine critical point by operation of the screw 41.

It is apparent that my fluid pressure switch may be used in different connections, wherever it is desired to automatically control electrical devices or apparatus by fluid pressure differentials, as in the automatic ignition of gas heating devices, the turning off and on of compressors and others.

I claim:

1. In a fluid pressure switch, a front plate having a recess in the rear face thereof, with an annular flange surrounding the recess, a bearing plate having a recess in the front face, with an annular flange surrounding the recess, a diaphragm, means for clamping the two flanges upon the rim of the diaphragm whereby the diaphragm is made to separate the two recesses, a housing mounted upon the rear of the bearing plate and having a flange secured upon the other flanges by the clamping means, means for admitting differential pressures into the first recess and into the housing, the bearing plate having orifices establishing limited communication between the housing and the second recess, a piston slidable in the bearing plate and having a disc lying against the diaphragm, a bracket mounted in the housing and having a leaf spring bearing on the piston and urging the piston toward the diaphragm, and a switch mounted in the housing and having an operating member alined with the piston for operation by the latter when the pressure in the first recess reaches a predetermined degree.

2. In a fluid pressure switch, a front plate having a recess in the rear face thereof, with an annular flange surrounding the recess, a bearing plate having a recess in the front face with an annular flange surrounding the recess, a diaphragm, means for clamping the two flanges upon the rim of the diaphragm whereby the diaphragm is made to separate the two recesses, a housing mounted upon the rear of the bearing plate and having a flange secured upon the other flanges by the clamping means, means for admitting differential pressures into the first recess and into the housing, the bearing plate having orifices establishing limited communication between the housing and the second recess, a piston slidable in the bearing plate and having a disc lying against the diaphragm, a bracket mounted in the housing and having a leaf spring bearing on the piston and urging the piston toward the diaphragm, and a switch mounted in the housing and having an operating member alined with the piston for operation by the latter when the pressure in the first recess reaches a predetermined degree, the bracket and the switch being mounted upon the bearing plate and being removable therewith as a unit.

3. In a fluid pressure switch, a front plate having a recess in the rear face thereof, with an annular flange surrounding the recess, a bearing plate having a recess in the front face with an annular flange surrounding the recess, a diaphragm, means for clamping the two flanges upon the rim of the diaphragm whereby the diaphragm is made to separate the two recesses, a housing mounted upon the rear of the bearing plate and having a flange secured upon the other flanges by the clamping means, means for admitting differential pressures into the first recess and into the housing, the bearing plate having orifices establishing limited communication between the housing and the second recess, a piston slidable in the bearing plate and having a disc lying against the diaphragm, a bracket mounted in the housing and having a leaf spring bearing on the piston and urging the piston toward the diaphragm, and a switch mounted in the housing and having an operating member alined with the piston for operation by the latter when the pressure in the first recess reaches a predetermined degree, the leaf spring having means for adjusting the tension thereof, and the housing having an opening giving access to the adjusting means and means for normally closing the opening.

4. In a fluid pressure switch, a front plate having a recess in the rear face thereof, with an annular flange surrounding the recess, a bearing plate having a recess in the front face with an annular flange surrounding the recess, a diaphragm, means for clamping the two flanges upon the rim of the diaphragm whereby the diaphragm is made to separate the two recesses, a housing mounted upon the rear of the bearing plate and having a flange secured upon the other flanges by the clamping means, means for admitting differential pressures into the first recess and into the housing, the bearing plate having orifices establishing limited communication between the housing and the second recess, a piston slidable in the bearing plate and having a disc lying against the diaphragm, a bracket mounted in the housing and having a leaf spring bearing on the piston and urging the piston toward the diaphragm, and a switch mounted in the housing and having an operating member alined with the piston for operation by the latter when the pressure in the first recess reaches a predetermined degree, the disc being of a size slightly less than the operative size of the diaphragm, and the latter being waved outside the disc for flexing in response to pressure differentials.

5. In a fluid pressure switch, a front plate having a recess in the rear face thereof, with an annular flange surrounding the recess, a bearing plate having a recess in the front face, with an annular flange surrounding the recess, a diaphragm, means for claming the two flanges upon the rim of the diaphragm whereby the diaphragm is made to separate the two recesses, a housing mounted upon the rear of the bearing plate and having a flange secured upon the other flanges by the clamping means, means for admitting a pressure medium into the first recess, a piston slidable in the bearing plate and having a disc lying against the diaphragm, a bracket mounted in the housing and having a leaf spring bearing on the piston and urging the piston toward the diaphragm, and a switch mounted in the housing and having an operating member alined with the piston for operation by the latter when the pressure in the first recess reaches a predetermined degree.

6. In a fluid pressure switch, a front plate having a recess in the rear face thereof, with an annular flange surrounding the recess, a bearing plate having a recess in the front face, with an annular flange surrounding the recess, a diaphragm, means for clamping the two flanges upon the rim of the diaphragm whereby the diaphragm is made to separate the two recesses, a housing mounted upon the rear of the bearing plate and having a flange secured upon the other flanges by the clamping means, means for admitting a pressure medium into the first recess, a piston slidable in the bearing plate and having a disc lying against the diaphragm, a bracket mounted in the housing and having a leaf spring bearing on the piston and urging the piston toward the diaphragm, and a switch mounted in the housing and having an operating member alined with the piston for operation by the latter when the pressure in the first recess reaches a predetermined degree, the bracket and the switch being mounted upon the bearing plate and being removable therewith as a unit.

7. In a fluid pressure switch, a front plate having a recess in the rear face thereof, with an annular flange surrounding the recess, a bearing plate having a recess in the front face, with an annular flange surrounding the recess, a diaphragm, means for clamping the two flanges upon the rim of the diaphragm whereby the diaphragm is made to separate the two recesses, a housing mounted upon the rear of the bearing plate and having a flange secured upon the other flanges by the clamping means, means for admitting a pressure medium into the first recess, a piston slidable in the bearing plate and having a disc lying against the diaphragm, a bracket mounted in the housing and having a leaf spring bearing on the piston and urging the piston toward the diaphragm, and a switch mounted in the housing and having an operating member alined with the piston for operation by the latter when the pressure in the first recess reaches a predetermined degree, the leaf spring having means for adjusting the tension thereof, and the housing having an opening giving access to the adjusting means and means for normally closing the same.

8. In a fluid pressure switch, a front plate having a recess in the rear face thereof, with an annular flange surrounding the recess, a bearing plate having a recess in the front face, with an annular flange surrounding the recess, a diaphragm, means for clamping the two flanges upon the rim of the diaphragm whereby the diaphragm is made to separate the two recesses, a housing mounted upon the rear of the bearing plate and having a flange secured upon the other flanges by the clamping means, means for admitting a pressure medium into the first recess, a piston slidable in the bearing plate and having a disc lying against the diaphragm, a bracket mounted in the housing and having a leaf spring bearing on the piston and urging the piston toward the diaphragm, and a switch mounted in the housing and having an operating member alined with the piston for operation by the latter when the pressure in the first recess reaches a predetermined degree, the disc being of a size slightly less than the operative size of the diaphragm, and the latter being waved outside the disc for flexing in response to pressure differentials.

ROBERT G. HESS.

REFERENCES CITED

The following references are of record in the file of this patent:

UNITED STATES PATENTS

| Number | Name | Date |
| --- | --- | --- |
| 1,444,403 | Varley | Feb. 6, 1923 |
| 2,281,764 | Hanke | May 5, 1942 |
| 2,412,377 | Williams | Dec. 10, 1946 |